US008643374B2

(12) United States Patent
Mackay (10) Patent No.: US 8,643,374 B2
(45) Date of Patent: Feb. 4, 2014

(54) ELECTRODE STRUCTURE FOR MARINE ELECTROMAGNETIC GEOPHYSICAL SURVEY TRANSDUCER CABLES

(75) Inventor: James Mackay, Edinburgh (GB)

(73) Assignee: PGS Geophyscial AS, Lysaker (NO)

( * ) Notice: Subject to any disclaimer, the term of this patent is extended or adjusted under 35 U.S.C. 154(b) by 565 days.

(21) Appl. No.: 12/928,677

(22) Filed: Dec. 16, 2010

(65) Prior Publication Data
US 2012/0153959 A1  Jun. 21, 2012

(51) Int. Cl.
*G01V 3/12* (2006.01)
(52) U.S. Cl.
USPC .......................................................... 324/365
(58) Field of Classification Search
USPC .......................................................... 324/365
See application file for complete search history.

(56) References Cited

U.S. PATENT DOCUMENTS

| | | | |
|---|---|---|---|
| 3,900,543 A | | 8/1975 | Davis |
| 4,617,518 A | | 10/1986 | Srnka |
| 7,446,535 B1 * | | 11/2008 | Tenghamn et al. ........... 324/365 |
| 7,642,784 B2 * | | 1/2010 | Reddig et al. .................. 324/329 |
| 7,884,612 B2 * | | 2/2011 | Conti et al. ..................... 324/365 |
| 8,198,899 B2 * | | 6/2012 | Lindqvist ....................... 324/365 |
| 2006/0202697 A1 * | | 9/2006 | Sodal .............................. 324/332 |
| 2010/0231224 A1 * | | 9/2010 | Lindqvist ....................... 324/365 |
| 2011/0260730 A1 * | | 10/2011 | Sudow et al. .................. 324/365 |
| 2011/0286303 A1 * | | 11/2011 | Paull et al. ....................... 367/20 |

FOREIGN PATENT DOCUMENTS

| | | |
|---|---|---|
| EP | 2230535 A2 | 9/2010 |
| GB | 2404444 A | 2/2005 |
| WO | 2011107438 A1 | 9/2011 |

OTHER PUBLICATIONS

United Kingdom Search Report for Application No. GB1118693.9, dated: Nov. 28, 2011.

* cited by examiner

*Primary Examiner* — Jay Patidar

(57) ABSTRACT

A marine electromagnetic geophysical survey transducer cable includes a tow cable configured to couple to a tow vessel. A first electrode cable is coupled at a forward end to the tow cable. A second electrode cable is disposed aft of the first electrode cable and configured to indirectly couple to the tow vessel. At least one of the first and second electrode cables includes a cable core comprising a first core material having a first density selected to provide the transducer cable with a selected overall density, and at least one layer of electrically conductive strands disposed exterior to the cable core.

20 Claims, 11 Drawing Sheets

ELECTRODE STRUCTURE FOR MARINE ELECTROMAGNETIC GEOPHYSICAL SURVEY TRANSDUCER CABLES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The invention relates generally to the field of marine electromagnetic geophysical surveying apparatus. More specifically, the invention relates to electrode structures for marine electromagnetic geophysical survey transducers and methods for making such electrode structures.

Marine electromagnetic geophysical surveying is used to infer spatial distribution of electrical conductivity below the bottom of a body of water such as a lake or ocean. The spatial distribution of conductivity is used to assist determining presence of hydrocarbon bearing formations in the subsurface. One type of such surveying is known as "controlled source" electromagnetic surveying, and generally includes inducing a time varying electromagnetic field in the subsurface formations and measuring one or more parameters related to a response of the subsurface rock formations to the induced electromagnetic field.

Devices for inducing such electromagnetic fields are generally referred to as "sources" or "transmitters" and include, among other devices, spaced apart electrodes disposed along or at the ends of a cable. The cable may be towed by a vessel in the body of water. Time varying electric current is imparted across the electrodes to induce a time varying electromagnetic field in the water and subsequently in the subsurface formations. Structures typically used for the electrodes include metal cylinders or tubes. Such cylinders or tubes may be suspended at a selected depth in the water by the use of floatation devices such as buoys. Such electrode structures have respective deployment and maintenance procedures.

There is a need for improved structures for marine electromagnetic geophysical survey transducers and electrode structures used with such transducers, as well as methods for making the electrode structures.

SUMMARY OF THE INVENTION

A marine electromagnetic geophysical survey transducer cable according to one aspect of the invention includes a tow cable configured to couple to a tow vessel. A first electrode cable is coupled at a forward end to the tow cable. A second electrode cable is disposed aft of the first electrode cable and configured to indirectly couple to the tow vessel. At least one of the first and second electrode cables includes a cable core comprising a first core material having a first density selected to provide the transducer cable with a selected overall density. The at least one of the first and second electrode cables also include at least one layer of electrically conductive strands disposed exterior to the cable core.

Other aspects and advantages of the invention will be apparent from the following description and the appended claims.

DETAILED DESCRIPTION

Figure 1:
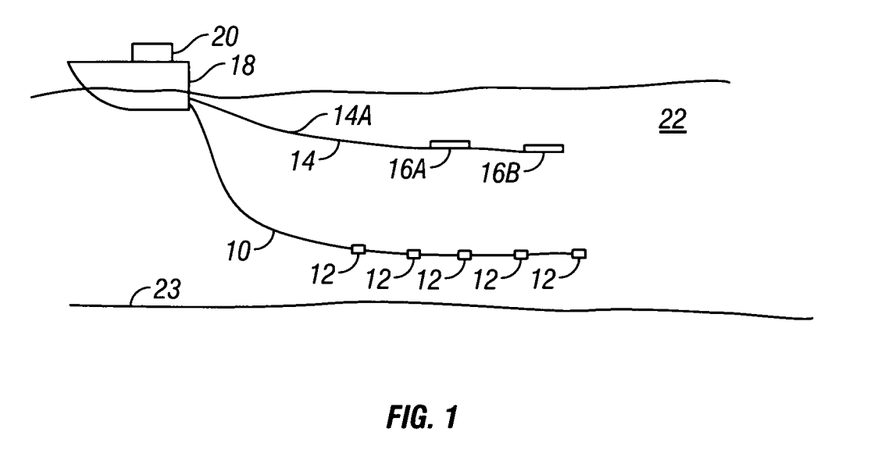
FIG. 1 shows an example marine electromagnetic geophysical survey system using an electrode type transmitter.

An example marine electromagnetic geophysical survey system is shown schematically in FIG. 1. The electromagnetic survey system includes a sensor cable 10 having thereon at longitudinally spaced apart positions a plurality of electromagnetic sensors 12. The sensor cable 10 is shown being towed by a survey vessel 18 moving on the surface of a body of water 22 such as a lake or ocean. The sensor cable 10 may alternatively be deployed on the water bottom 23, or one or more additional sensor cables may be so deployed. Alternatively, sensor nodes (not shown) may be used to detect electromagnetic signals.

The vessel 18 may include thereon equipment, shown generally at 20 and referred to for convenience as a "recording system" that may include devices (none shown separately) for navigation, energizing electrode cables for inducing an electromagnetic field in the formations below the water bottom 23, and for recording and processing signals generated by the various electromagnetic sensors 12 on the sensor cable 10. For example, electromagnetic sensors 12 may comprise electrode cables, and sensor cable 10 may electrically and/or optically couple electromagnetic sensors 12 to recording system 20 for recording and processing signals.

The electromagnetic survey system shown in FIG. 1 includes an electromagnetic source cable 14 for towing a device for inducing an electromagnetic field in the formations below the water bottom 23. The source cable 14 may consist of a tow cable 14A coupled to the vessel 18 and including insulated conductors (52 and 54 in FIG. 4) and a strength member (not shown separately) to transmit axial towing force from the vessel 18. The aft end (as used herein, "aft" generally refers to the opposite direction of normal travel of vessel 18) of the tow cable 14A may be coupled to one end of a first electrode cable 16A. The aft end of the first electrode cable 16A may be coupled to a spacer cable 62. The aft end of the spacer cable 62 may be coupled to the forward end (as used herein, "forward" generally refers to the direction of normal travel of vessel 18) of a second electrode cable 16B. The source cable 14 may be towed by the survey vessel 18 or by a different vessel (not shown). The electrode cables 16A, 16B may be energized at selected times by an electrical current source (not shown separately) in the recording system 20, on source cable 14 (not shown), or in other equipment (not shown), so as to induce an electromagnetic field in the formations below the water bottom 23. The current may be, for example, alternating current for frequency domain electromagnetic surveying, or switched direct current (e.g., switching current on, switching current off, reversing current polarity, or sequential switching such as a pseudorandom binary sequence) for time domain electromagnetic surveying. The configuration shown in FIG. 1 induces a horizontal dipole electric field in the subsurface when the electrode cables 16A, 16B are energized by the electric current. The type of current used to energize the electrode cables is not limited to the foregoing as the invention is applicable to use with both frequency domain (continuous wave) and transient induced electromagnetic fields. The structure of the source cable 14 and the electrode cables 16A, 16B according to example embodiments of the invention will be explained further below.

Figure 2:
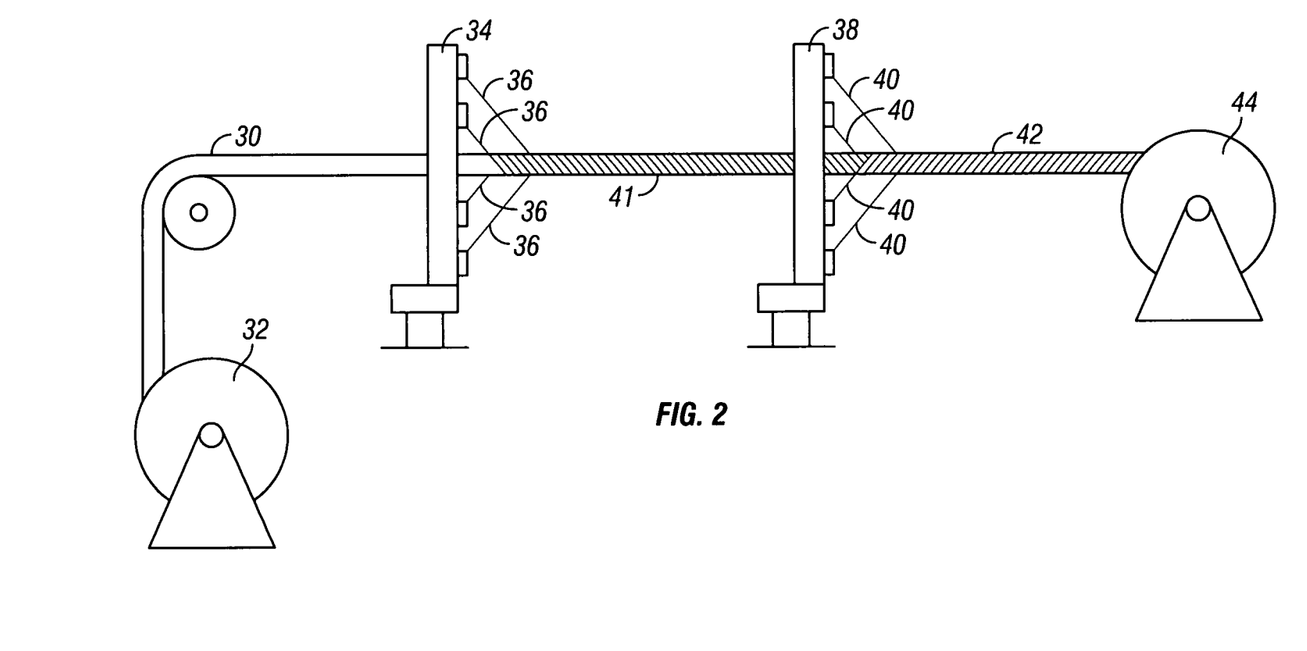
FIG. 2 shows an example process for making electrode cable.

In the present embodiment, the electrode cables 16A, 16B may be made from selected length segments of armored electrical cable, wherein electrically conductive strands are disposed on the exterior surface of a cable core. Referring to FIG. 2, an example structure for the electrode cables and an example method for making the electrode cables may include the following. A storage reel 32 or similar device may include premolded, cable core 30. The cable core 30 may be made, for example, from elastomer such as rubber or polyurethane and may include buoyancy filler such as hollow microspheres dispersed therein such as may be made from ceramic, glass, or plastic. The concentration of buoyancy filler in the elastomer may be selected to provide the overall finished cable structure with a selected density. In one example, the selected density may be substantially the same as that of the water in which the source cable (14 in FIG. 1) is to be deployed, or the selected density may be somewhat lower so that the overall source cable is substantially neutrally buoyant. Other materials may be used for the cable core 30 as long as such materials provide the completed cable with selected density and suitable strength and flexibility as will be further explained below.

Figure 3A:
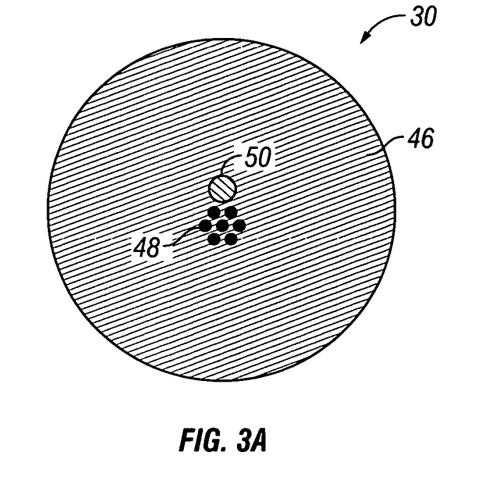
FIG. 3 shows examples of buoyant cores for an electrode cable.
Figure 3B:
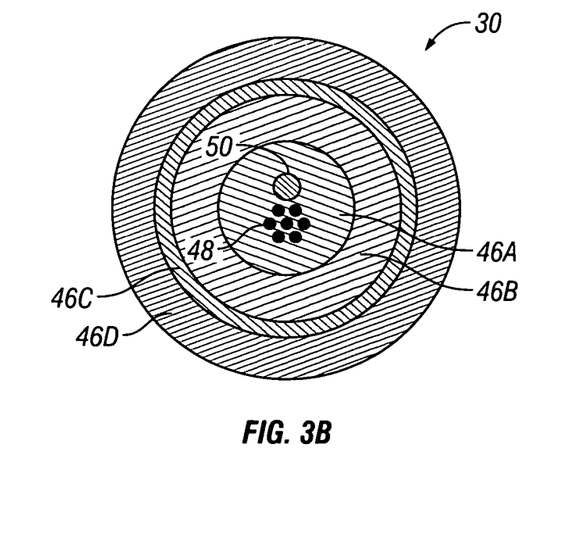

FIG. 3 shows examples of cross sections of embodiments of the cable core 30. As in FIG. 3A, the cable core 30 may include the above described elastomer with dispersed microspheres, as core material 46. Consequently, core material 46 may be buoyant. A strength member 48 may be disposed approximately in the center of the core material 46 to provide the completed cable with capability to transmit substantial axial loading. In other embodiments (not shown), strength member 48 may be disposed external to cable core 30. The strength member 48 may be made, for example, from fiber rope of types known in the art for such purpose. The cable core 30 may include one or more insulated conductors 50, which may be capable of transmitting electrical and/or optical signals. In some embodiments, insulated conductors 50 also may serve the functional purpose of strength member 48, enhancing or completely replacing strength member 48. The one or more insulated conductors 50 may be wound around the strength member 48 to avoid axially stressing the insulated conductors 50 when the electrode cable is subject to axial loading and/or bending. As illustrated in the example embodiment in FIG. 3B, cable core 30 may comprise a combination or mixture of a variety of core materials 46A-D. In the illustrated example, cable core 30 includes four layers of differing core materials 46A-D, though additional or fewer layers or other configuration of core materials 46A-D would be within the scope of the invention. Such core materials and layers may be selected to provide benefits such as buoyancy, strength, flexibility, redundancy, temperature insulation, electrical insulation, aqueous insulation, etc. One of ordinary skill in the art with the benefit of this disclosure would be able to select appropriate core materials 46A-D and configuration of such to suit the planned utilization of the electrode cable. Other embodiments of the cable core 30 to be explained further below may include a solid cross section extrusion of the core material 46, excluding the strength member 48 and/or the insulated conductors 50.

Referring back to FIG. 2, the cable core 30 may be passed through a first electrically conductive strand winding station 34. The first electrically conductive strand winding station 34 may be any type known in the art for winding fiber or wire around a device moved longitudinally through the center of the device. In the present example, the first electrically conductive strand winding station 34 is configured to helically wind first electrically conductive strands 36 about the exterior of the cable core 30 in a first helical direction to produce a first strand covered core 41. The first electrically conductive strands 36 may be made from an electrically conductive material, for example, carbon fiber, graphite impregnated glass fiber or other fiber, or metal. Metals may include, for example and without limitation, 316 alloy stainless steel, titanium, or titanium clad copper. In some embodiments, the electrically conductive strands 36 may comprise mixed-metal-oxide coated wire, such as titanium or titanium clad copper wire. In the present embodiment the first strand covered core 41 may be conducted through a second electrically conductive strand winding station 38 which may wind second electrically conductive strands 40 about the exterior of the first strand covered core 41. The second electrically conductive strands 40 are also made from electrically conductive material and may be the same or a different material than that used for the first electrically conductive strands 36. The second electrically conductive strands 40 may be wound helically in the opposite direction to the wind direction of the first electrically conductive strands 36 so that when axial loading is applied to the completed cable 42, it will resist torsion. After the second electrically conductive strands 40 are wound around the first strand covered core 41, the completed cable 42 may be transferred to a storage reel 44. Alternatively, the completed cable 42 may be cut to one or more selected length segments and stored accordingly.

In other embodiments, only the first electrically conductive strands 36 may be used, such that the first strand covered core 41 constitutes the completed electrode cable 42. In other embodiments as previously stated and as will be described below in more detail, the cable core 30 may exclude the one or more insulated conductors (50 in FIG. 3) and/or the strength member (48 in FIG. 3). In still other embodiments, more than two layers of electrically conductive strands may be successively applied to the exterior of the cable core 30.

Figure 4:
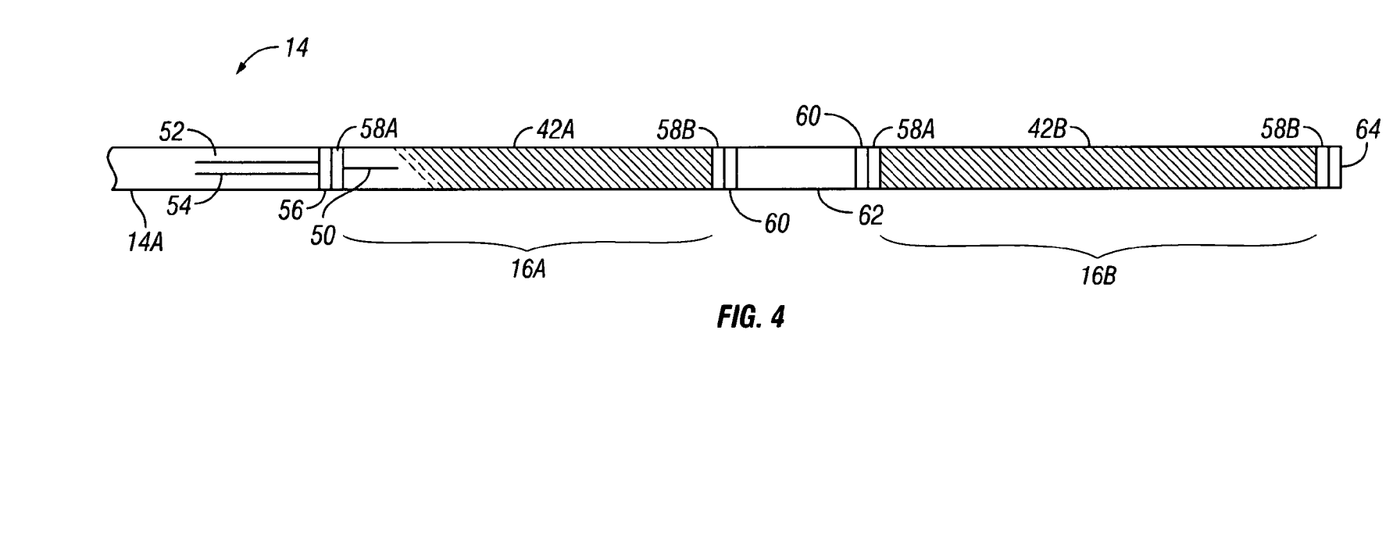
FIG. 4 shows an example source cable having electrode cables made from segments of the example cable shown in FIG. 2.

FIG. 4 shows an example embodiment of the source cable 14. The source cable 14, as previously explained, may include a tow cable 14A that includes insulated conductors 52, 54 therein and suitable axial load carrying components (one or more strength members—not shown) to enable transmission of towing force from the vessel (18 in FIG. 1) to the remaining components of the source cable 14. The tow cable 14A may be terminated at its aft end by a termination plate 56 that is configured to make suitable electrical and mechanical connection to the first electrode cable 16A coupled thereto at one of its longitudinal ends. The first electrode cable 16A may include a selected length of the completed cable (42 in FIG. 2) made, for example, as explained with reference to FIG. 2. A forward termination 58A on the first electrode cable 16A may make mechanical and electrical connection to the termination plate 56 at the aft end of the tow cable 14A. In the present embodiment, one of the insulated conductors in the tow cable 14A, for example, insulated conductor 54, may be electrically connected to the armor 42A on the exterior of the first electrode cable 16A. Another electrical conductor in the tow cable 14A, for example, insulated conductor 52, may be electrically connected to the insulated conductors (50 in FIG. 3) inside the cable core (30 in FIG. 3). Such electrical connection may be made by any suitable electrical connectors (not shown) disposed in the respective cable end terminations 58A, 56.

The first electrode cable 16A may be terminated at its aft end by an aft termination 58B. The aft termination 58B may make electrical and mechanical connection to the spacer cable 62. The spacer cable 62 may include one or more internally disposed, insulated conductors (not shown) configured to make electrical connection to the insulated conductors (50 in FIG. 3) in the first electrode cable 16A. The spacer cable 62 may have electrically insulating material on its exterior surface to cause the first electrode cable 16A and the second electrode cable 16B, coupled to the aft end of the spacer cable 62, to be electrically isolated from each other. The spacer cable 62 may include suitable electrical and mechanical terminations 60 at each axial end thereof to couple to corresponding terminations on the axial ends of the first 16A and second 16B electrode cables.

The second electrode cable 16B may be made from a selected length of completed cable (42 in FIG. 2) similar to the first electrode cable 16A. The second electrode cable 16B may be terminated at its axial ends by suitable connectors 58A, 58B similar in structure to the connectors on the axial ends of the first electrode cable 16A. In the present embodiment, electrical connection may be made between the conductors (not shown) in the spacer cable 62 and the armor 42B of the second electrode cable 16B. Ultimately, the armor 42B of the second electrode cable 16B may be electrically connected to one of the insulated conductors 52, 54 in the tow cable 14A, while the armor 42A of the first electrode cable 16A is electrically connected to the other one of the insulated conductors 52, 54 in the tow cable 14A. The second electrode cable aft termination 58B may be closed by a "bull plug" 64 or similar device that excludes entry of water into the interior of the aft termination 58B.

Advantageously, a source cable 14 having electrode cables 16A, 16B and spacer cable 62 as explained herein may provide that the tow cable 14A, electrode cables 16A, 16B and the spacer cable 62 are all approximately the same external diameter so as to reduce turbulence when the source cable 14 is towed in the water. The electrode cables 16A, 16B may also be sufficiently flexible so as to be able to be deployed from and stored on a winch (not shown), preferably the same winch as used to deploy the tow cable 14A. Thus, the entire source cable 14 may be deployed from a single winch.

Because flexibility and minimum bend radius of the electrode cables 16A, 16B are considerations in the design of a source cable according to the invention, other embodiments of the electrode cables may be configured differently to provide a suitable minimum bend radius, while maintaining sufficient conductor surface area of the electrode portions of the source cable 14 to conduct a desired electric current into the water. (As would be understood by one of ordinary skill in the art, requirements of the particular marine electromagnetic geophysical survey may determine the desired electric current. Such requirements may include the salinity of the water, the towing depth of the source, the subsurface depth of the formation, safety and environmental concerns, etc. Desired electric currents may range from about 100 amps to about 5000 amps or more.) It may also be desirable to make electrode cables having a simplified electrical and mechanical structure, for example, to omit the electrical conductors in the center of the electrode cable, and to provide electrical and mechanical terminations at the axial ends of the electrode cables that do not require separate electrical connectors.

Figure 5A:
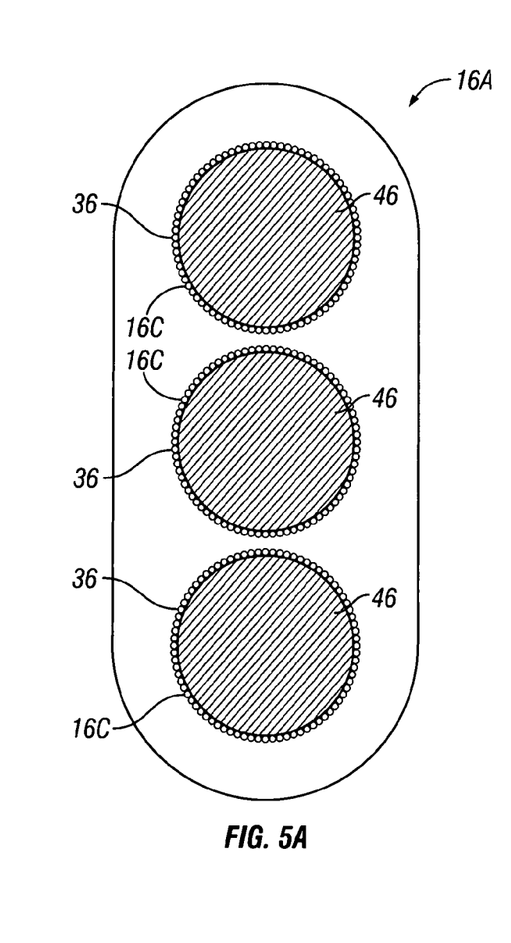
FIG. 5A shows a cross section of another embodiment of an electrode cable.
Figure 5B:
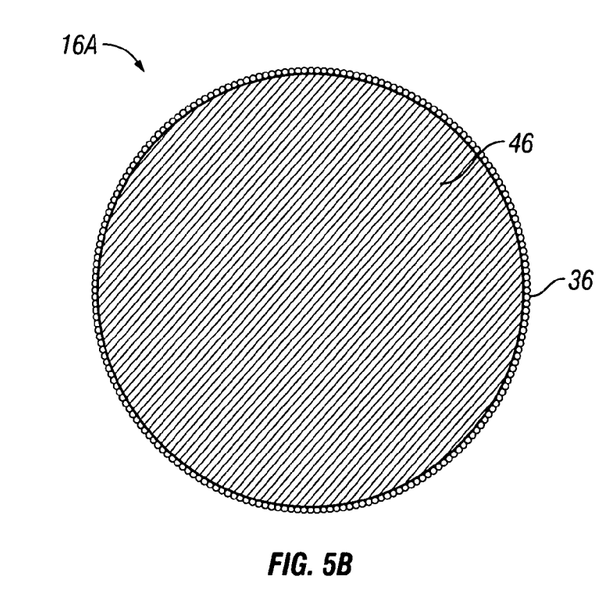
FIG. 5B shows a cross section of another embodiment of an electrode cable.

Example embodiments of electrode cable are shown in cross section in FIGS. 5A and 5B to illustrate possible selections of cable diameter and numbers of electrically conductive strands to provide desired conductor surface area, conductor length, and minimum bend radius. (As would be understood by one of ordinary skill in the art, requirements of the particular marine electromagnetic geophysical survey may determine the desired conductor surface area and conductor length. Such requirements may include, for example, the amount of current to be passed through the electrode cables.) The following examples may also have simplified electrical and mechanical features of the types explained above. FIG. 5A includes three separate electrode cables 16C that may be combined by connection to common axial terminations to form one effective electrode cable. Such combined electrode cable may be used in either or both of the electrode cables such as shown in FIG. 1 at 16A and 16B. Each separate electrode cable 16C may include a solid cross section of core material 46. In the present example, the core material 46 may have a diameter of 46.8 mm. The core material 46 may be covered by a single layer of electrically conductive strands 36, which in the present example may include 80 strands of 1.6 mm diameter titanium clad copper wire. As explained with reference to FIG. 2, the electrically conductive strands 36 may be helically wound around the core material 46. In an electrode cable segment 18 meters long using the combined electrode cable configuration shown in FIG. 5A, the conductor surface area of the electrically conductive strands 36 is about 6.65 square meters.

Figure 6:
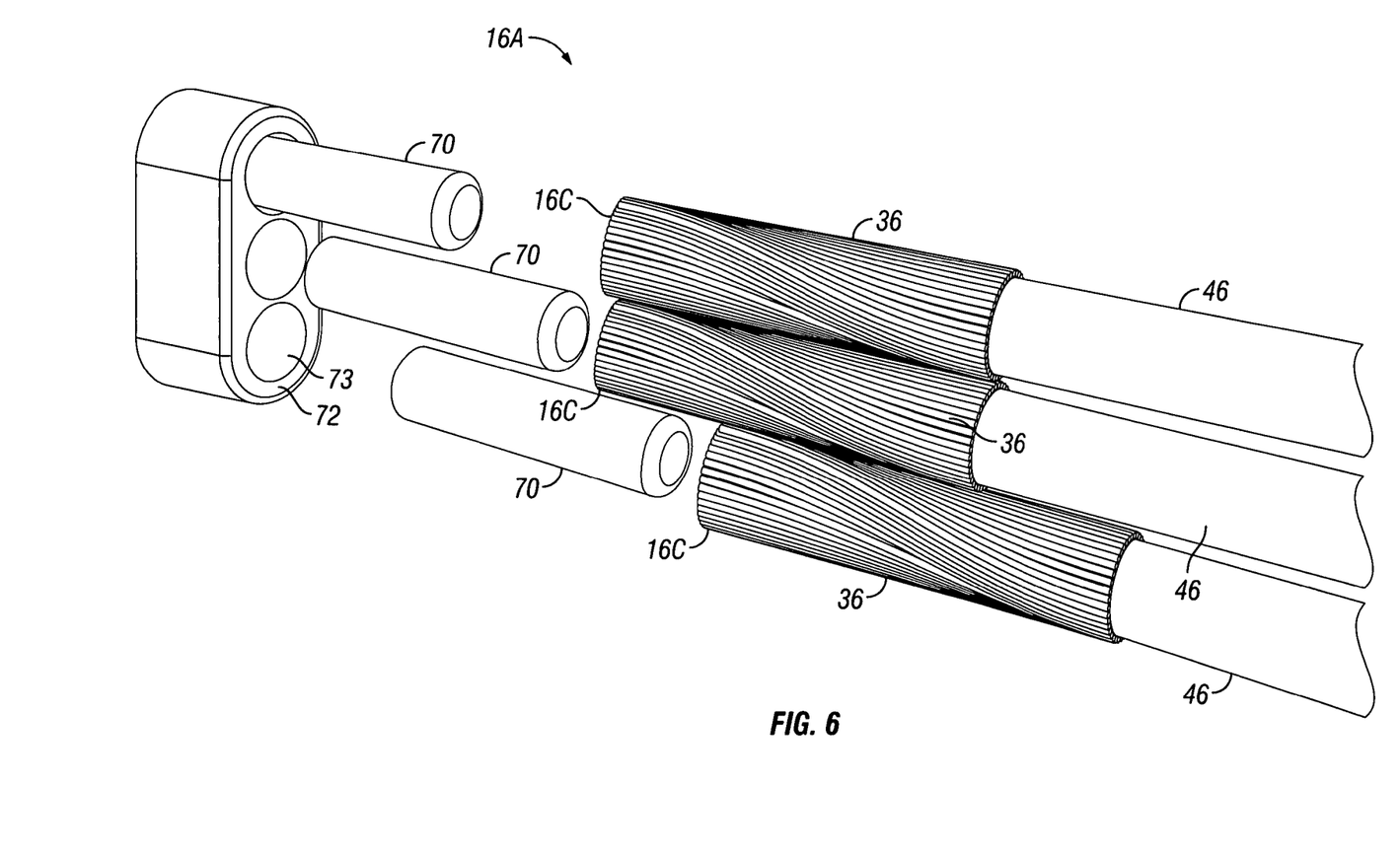
FIG. 6 shows an exploded, sectioned view of a termination for an embodiment of the electrode cable similar to the one shown in FIG. 5A.

An example termination for an electrode cable 16A similar to the configuration shown in FIG. 5A is shown in sectioned, exploded view in FIG. 6. The core material 46 and electrically conductive strands 36 for each of the three separate electrode cables 16C are shown in sectioned view. In the present example, the electrically conductive strands may be made from 316 alloy stainless steel, and there may be 40, 3.25 mm diameter strands wound around the core material 46 for each separate electrode cable 16C. The termination at each axial end of the electrode cable 16A may include an end cap 72 with receptacles 73 for the ends of each of the three strand layers. A stainless steel sleeve or spigot 70 may be disposed between the electrically conductive strands 36 and the core material 46 to protect the core material 46. The ends of the electrically conductive strands 36 may be inserted into a respective receptacle 73 and welded to the end cap 72. The end cap 72 may include any suitable feature to mechanically connect the end cap to either the tow cable (14A in FIG. 1) or to one end of the spacer cable (62 in FIG. 1). Electrical connection of the electrically conductive strands 36 to one or the other of the insulated conductors (52, 54 in FIG. 4) in the tow cable (14A in FIG. 1) may be made by any suitable means.

FIG. 5B shows a different embodiment including only a single electrode cable 16A. The electrode cable 16A may include a solid cross section of the core material 46 having a diameter of about 116.8 mm. The core material 46 may be covered by a single, helically wound layer of 200, 1.6 mm diameter titanium clad copper wire strands. The conductor surface area of an electrode cable segment of 18 meters length using the single cable configuration is about 8.48 square meters. In comparison with the embodiment shown in FIG. 5A, the embodiment shown in FIG. 5B has more conductor surface area, however, the embodiment shown in FIG. 5A may have greater axial load strength because it includes 240 wire strands. The embodiment in FIG. 5A may also have a smaller minimum bend radius because each separate electrode cable 16C is much smaller in diameter than the diameter of the single electrode cable shown in FIG. 5B.

Figure 7:
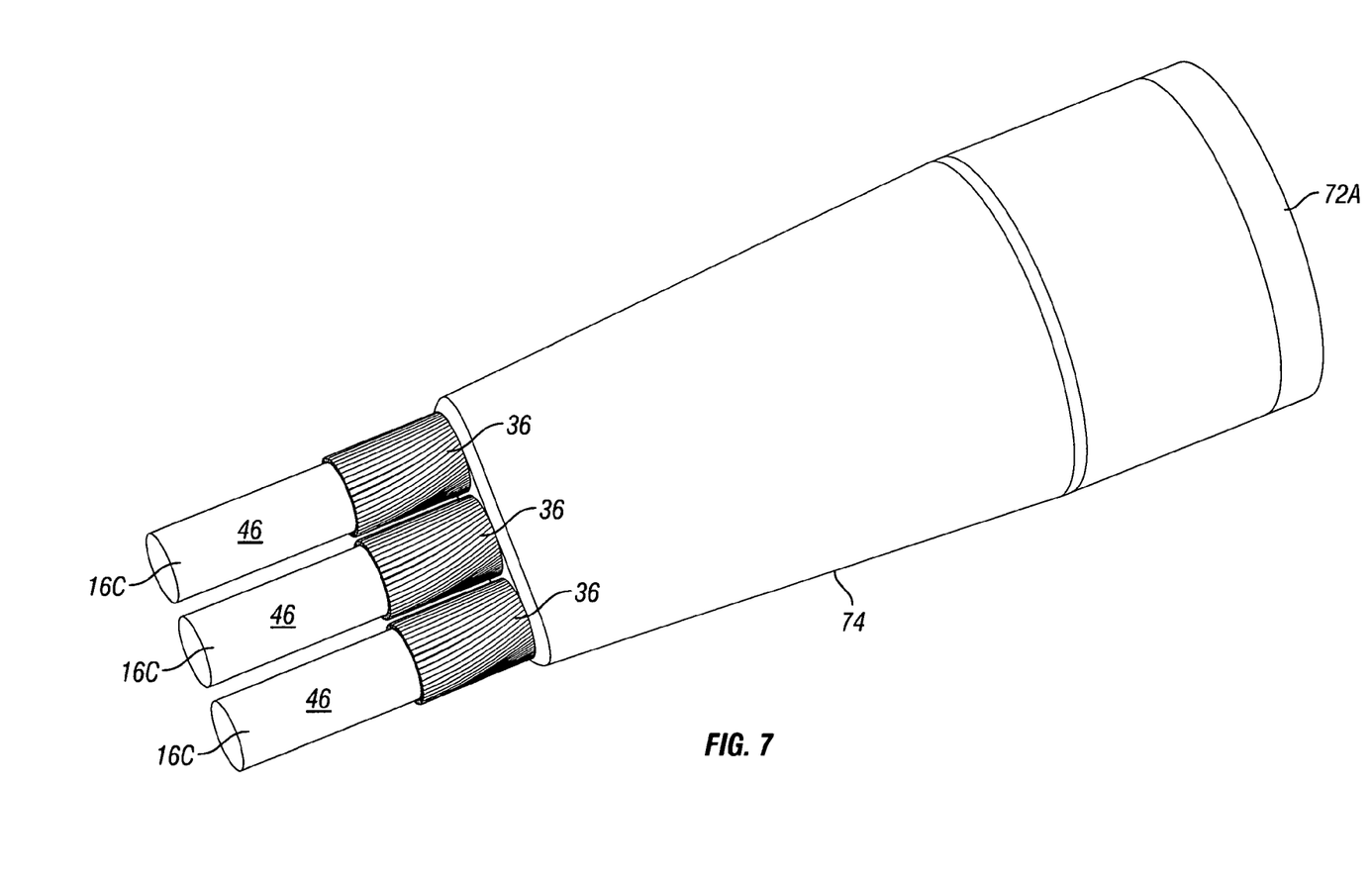
FIG. 7 shows an example of an overmolded, crimped connector.

In embodiments that use titanium clad copper wire for the electrically conductive strands, it may be impractical to weld the end cap 72 or other termination to each of the electrically conductive strands 36. In such embodiments, it may be desirable, therefore, to use a crimped connector instead of a welded on end cap as in FIG. 6. FIG. 7 shows an example of a crimped connector 72A coupled to the axial ends of the separate electrode cable 16C. The crimped connector 72A may be made from a different metal than the electrically conductive strands 36, for example and without limitation, 316 alloy stainless steel. In such cases, the contact between the crimped connector 72A and the electrically conductive strands 36 may be isolated from the water to reduce the possibility of corrosion. An example of isolation is an impermeable, electrically insulating overmold 74 as shown in FIG. 7. The overmold 74 may be made, for example and without limitation, from elastomer such as rubber or polyurethane. The overmold 74 also preferably has a tapered external diameter as shown in FIG. 7 to provide a bend stiffness transition between the crimped connector 72A and the exposed portion of the separate electrode cables 16C.

The foregoing embodiments shown in FIGS. 6 and 7 may also be made using only a single electrode cable, such as the embodiment shown in FIG. 5B. In embodiments using solid section core material as explained above, the spacer cable (62 in FIG. 1) may be made from electrically non-conductive material, such as fiber rope, and may include suitable mechanical connectors at each axial end for coupling to the end cap (72 in FIG. 6) or other mechanical termination used on the ends of the electrode cables. In such embodiments, electrical connection between the tow cable (14A in FIG. 4) and the second electrode cable (16B in FIG. 4) may be made using an insulated conductor (not shown) disposed, for example, along the exterior of the spacer cable 62.

Any one of the embodiments of the electrode cables described above may include a fluid permeable, woven fiber braid disposed over the electrically conductive strands to help resist abrasion. Such fiber braid may be particularly useful when the electrically conductive strands are made of titanium clad copper and/or mixed-metal-oxide coated titanium clad copper so that possibility of penetration of the mixed-metal-oxide coating or titanium cladding may be reduced.

Figure 8:
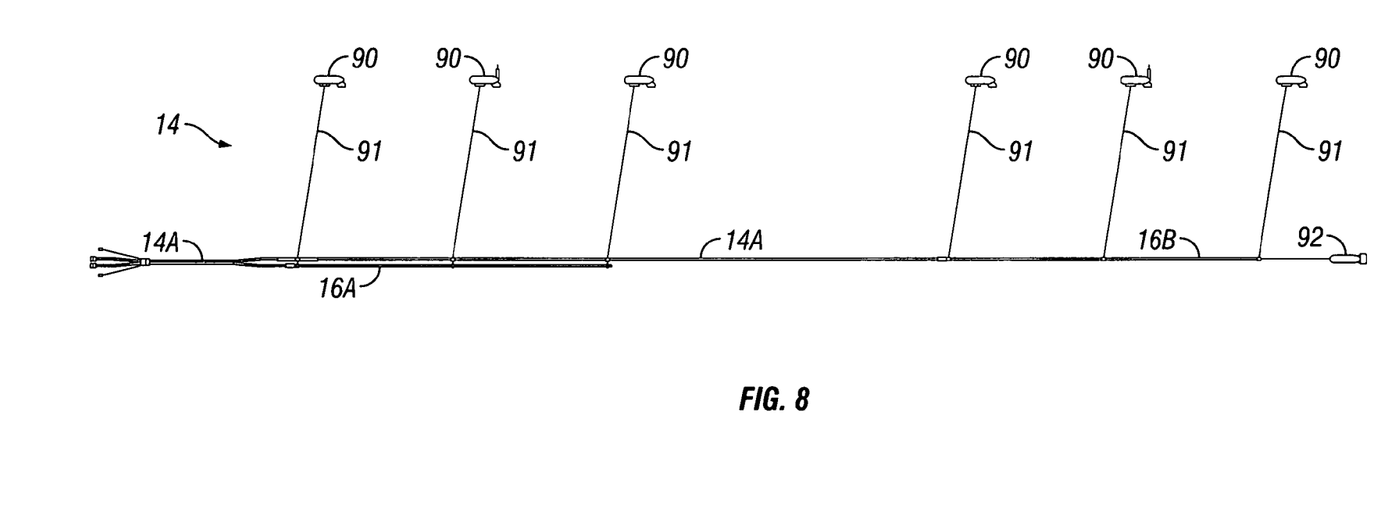
FIG. 8 shows an example embodiment of a source cable suspended in a body of water from floatation devices.

Another example embodiment of a source cable 14 that may be suspended at a selected depth in the water will now be explained with reference to FIGS. 8 through 11. Referring first to FIG. 8, the entire source cable 14 is shown. The example embodiment of the source cable 14 may include the tow cable 14A coupled to the first electrode cable 16A. In this embodiment, tow cable 14A may also couple to the second electrode cable 16B proximate the aft end of the tow cable 14A. The source cable 14 may be suspended at a selected depth in the water from depth ropes 91 coupled to floatation devices shown at 90. A drag body 92 may be coupled to the aft end of the second electrode cable 16B to keep the submerged portion of the source cable 14 in a relatively straight line during movement in the water.

Figure 9:
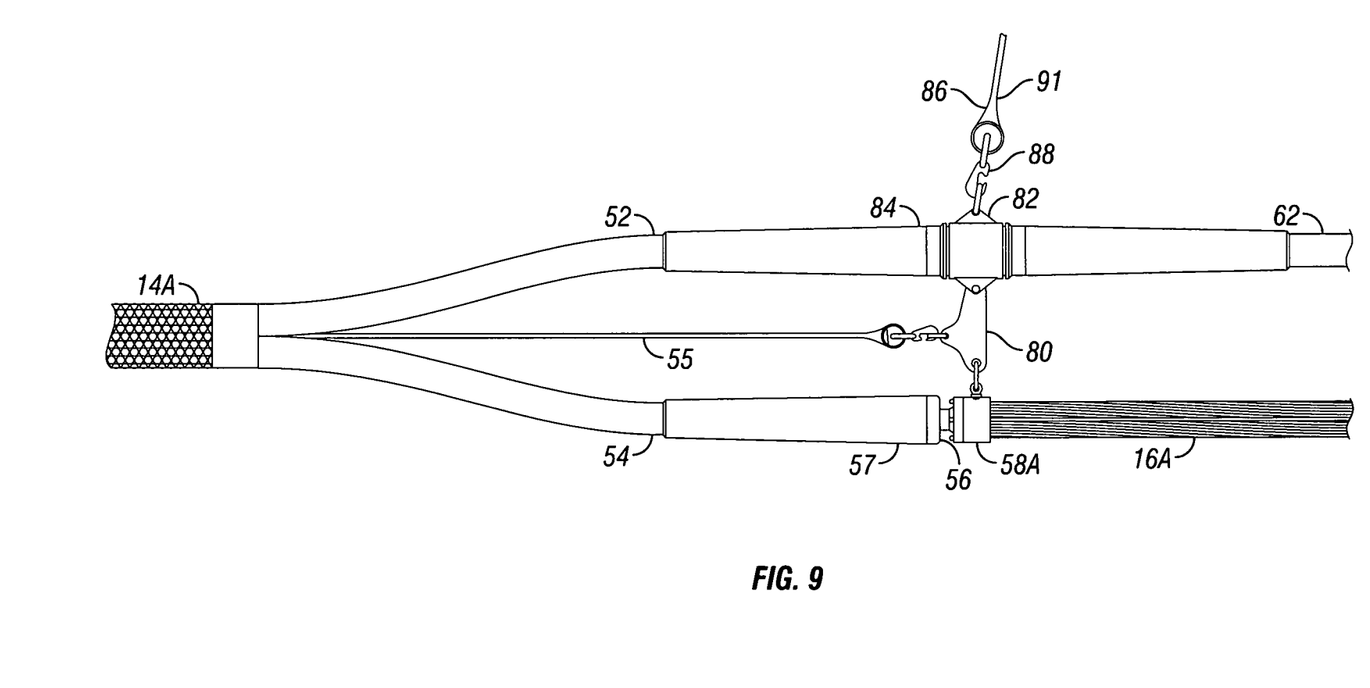
FIG. 9 shows a detail view of a portion of the source cable in FIG. 8.

FIG. 9 shows an example connection between the tow cable 14A and the forward end of the first electrode cable 16A. As previously explained, the tow cable 14A may include insulated conductors 52, 54 and a strength member 55. The aft termination 56 of one of the insulated conductors 52 may be coupled to the forward termination 58A of the first electrode cable 16A. In the present embodiment, the aft termination 56 and the forward termination 58A may be flanges that may be coupled using any suitable coupling, such as clamps, a threaded sleeve, or capscrews. The terminal end of the insulated conductor 54 may have an electrically insulating overmold 57 to provide electrical insulation and a bend stiffness transition between the insulated conductor 54 and the first electrode cable 16A.

In the present embodiment, insulated conductor 54 may be spliced to a portion of the tow cable 14A. In the present embodiment, such portion of the tow cable 14A may be made from insulation covered aluminum. Along the splice, an overmold 84 may be applied to the insulated conductor 52 and tow cable 14A. The longitudinal position of the connection between the first electrode cable 16A and insulated conductor 54, and the tow cable 14A and insulated conductor 52, may be a convenient position to couple one of the depth ropes 91 to suspend the source cable (see FIG. 8). The coupling for the depth rope 91 may include a collar 82 affixed to the exterior of the overmold 84. The collar may be coupled to a lower end of the depth rope 91 using any conventional termination 86 known in the art. A clamp, hook, or other coupling 88 may couple conventional termination 86 to collar 82. A suspension coupling 80, which in the present embodiment may be a generally "T" shaped metal or plastic bracket, may be coupled to the bottom of the collar 82 and to the forward termination 58A of the first electrode cable 16A. The suspension coupling 80 may also be coupled to the strength member 55 so that axial loading from the tow cable 14A is not applied directly to the coupling points between the insulated conductors 52, 54 and the respective first electrode cable 16A and second electrode cable 16B.

Figure 10:
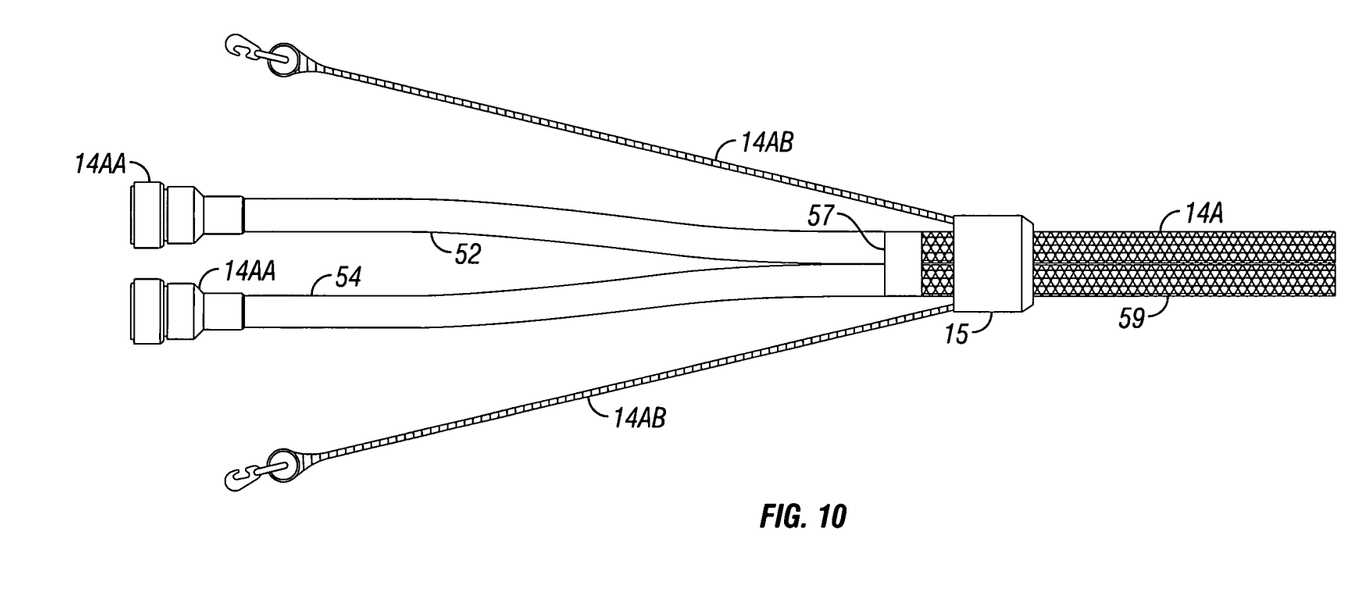
FIG. 10 shows a detail view of a portion of the source cable in FIG. 8.

FIG. 10 shows an example of an end of the tow cable 14A aboard the survey vessel (18 in FIG. 1). In the present embodiment, in addition to the insulated conductors 52, 54 and the strength member (55 in FIG. 9), the tow cable 14A may include an exterior braided armor layer 59, for example, made from high strength fiber or steel, to provide the tow cable 14A with additional strength and abrasion resistance. A plastic or rubber jacket 57 may be applied under the armor 59 to provide the two cables 14A with extra resistance to water intrusion and consequent electrical leakage from the insulated conductors 52, 54. Electrical connectors 14AA may couple each of the insulated conductors 52, 54 to suitable mating connectors (not shown) in the recording unit (20 in FIG. 1). Axial loading may be transferred from the vessel (18 in FIG. 1) to the tow cable 14A using a self tightening or clamp-on sleeve 15. The sleeve may be coupled to one or more tow cables 14AB that are physically connected to a suitable towing fixture (not shown) on board the vessel (18 in FIG. 1).

Figure 11:
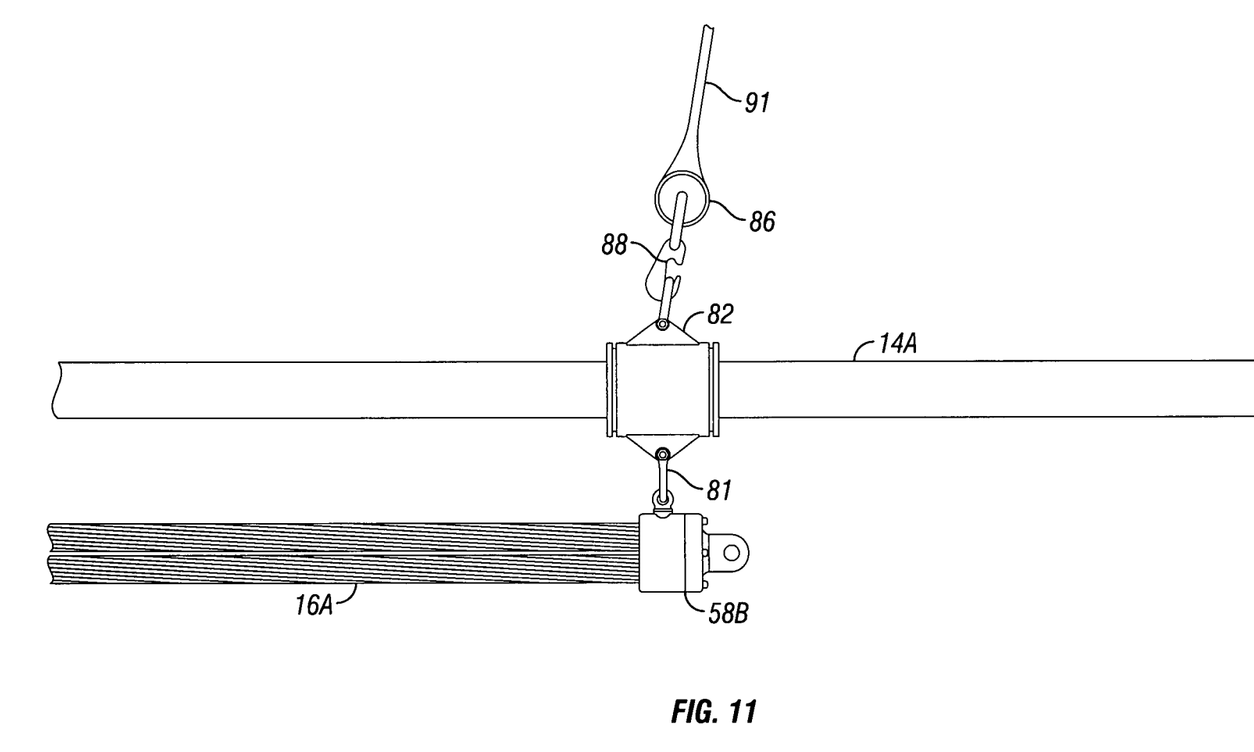
FIG. 11 shows a detail view of a portion of the source cable in FIG. 8.

FIG. 11 shows the aft end of the first electrode cable 16A in the present embodiment. The aft end may include the aft termination 58B according to the various embodiments explained above. The aft termination 58B may be coupled to a second collar 82 affixed to the tow cable 14A using a link or bracket 81. The second collar 82 may be coupled to one of the depth ropes 91 as explained with reference to FIG. 9.

The embodiments shown in FIGS. 8-11 may use a single axial load bearing tow cable 14A to which both electrode cables 16A, 16B are attached, or may include one or more load bearing tow cables for each electrode cable 16A, 16B.

While the foregoing embodiments are described with reference to a source or transmitter cable for an electromagnetic surveying system, similar structures including electrode cables as explained above may also be used for electromagnetic receivers. For purposes of defining the scope of the invention, the term "transducer cable" is used herein and is intended to mean a cable structure as described herein above in which the electrode cables perform either the function of imparting electric current into a body of water or detecting voltages in the body of water.

Embodiments of a marine electromagnetic geophysical survey transmitter made with electrode cables described as explained with reference to the various examples herein may be easier to store and deploy from a survey vessel, and may be less costly to make and maintain.

While the invention has been described with respect to a limited number of embodiments, those skilled in the art, having benefit of this disclosure, will appreciate that other embodiments can be devised which do not depart from the scope of the invention as disclosed herein. For example, whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Accordingly, the scope of the invention should be limited only by the attached claims.

What is claimed is:

1. A marine electromagnetic geophysical survey transducer cable, comprising:
   a tow cable configured to couple to a tow vessel;
   a first electrode cable coupled at a forward end to the tow cable; and
   a second electrode cable disposed aft of the first electrode cable and configured to indirectly couple to the tow vessel, wherein at least one of the first and second electrode cables includes:
      a cable core comprising a first core material having a first density selected to provide the transducer cable with a selected overall density; and
      at least one layer of electrically conductive strands disposed exterior to the cable core, the electrically conductive strands in electrical contact with a body of water when the electrically conductive strands are disposed in the body of water.

2. The transducer cable of claim 1 wherein the first core material comprises elastomer having buoyancy filler therein.

3. The transducer cable of claim 2 wherein the buoyancy filler comprises hollow microspheres.

4. The transducer cable of claim 1 wherein the selected overall density is selected to make the transducer cable neutrally buoyant in water in which the transducer cable is to be deployed.

5. The transducer cable of claim 1 wherein the electrically conductive strands comprise at least one material selected from the group consisting of: carbon fiber, graphite impregnated fiber, stainless steel, titanium, titanium clad copper, mixed-metal-oxide coated wire, and any combination thereof.

6. The transducer cable of claim 1 further comprising a second layer of electrically conductive strands disposed exterior to the at least one layer of electrically conductive strands, the at least one layer helically wound in a first direction, the second layer helically wound in a second direction opposed to the first direction.

7. The transducer cable of claim 1 wherein the cable core comprises an insulated conductor.

8. The transducer cable of claim 1 wherein the cable core comprises a strength member.

9. The transducer cable of claim 1 wherein at least one of the first and second electrode cables comprises a plurality of cable cores each surrounded by electrically conductive strands, a diameter of each cable core and a diameter and number of electrically conductive strands are selected to provide the at least one of the first and second electrode cables with a selected minimum bend radius and a selected electrically conductive surface area.

10. The transducer cable of claim 1 wherein a diameter of the cable core and a diameter and number of electrically conductive strands are selected so that an external diameter of the at least one of the first and second electrode cables is substantially the same as an outer diameter of the tow cable.

11. The transducer cable of claim 1 wherein the tow cable has an electrically non-conductive exterior.

12. The transducer cable of claim 1, further comprising a spacer cable coupled to an aft end of the first electrode cable and to a forward end of the second electrode cable.

13. The transducer cable of claim 1, wherein the second electrode cable is coupled to the tow cable.

14. The transducer cable of claim 1 further comprising at least one depth suspension device, each depth suspension device comprising:
   a floatation device; and
   a depth rope coupled between the floatation device and the tow cable, wherein a length of the depth rope is selected to cause the tow cable proximate the coupling to the depth rope to be suspended at a selected depth in a body of water.

15. The transducer cable of claim 1 wherein the first and second electrode cables are coupled to an electric current source so as to act as an electromagnetic transmitter when the electric current source is energized.

16. The transducer cable of claim 1 wherein the first and second electrode cables are coupled to a recording system so as to act as an electromagnetic sensor.

17. The transducer cable of claim 1 wherein the tow cable comprises a single axial load bearing cable.

18. The transducer cable of claim 1 wherein the tow cable comprises at least one load bearing cable for each of the electrode cables.

19. The transducer cable of claim 1 wherein the cable core further comprises a second core material having a second density.

20. The transducer cable of claim 1 wherein the first and second electrode cables comprise matching cable cores and layers of electrically conductive strands.

* * * * *